INVENTOR
ELMER H. SCHULZ
BY G. O. O'Brien
R. Baxter Warner
ATTORNEYS

INVENTOR
ELMER H. SCHULZ
BY
ATTORNEYS

United States Patent Office 2,812,510

Patented Nov. 5, 1957

2,812,510

FREQUENCY MODULATION SYSTEM

Elmer H. Schulz, Elmhurst, Ill., assignor, by mesne assignments, to the United States of America as represented by the Secretary of the Navy Application June 25, 1952, Serial No. 295,405

4 Claims. (Cl. 340—174)

The invention relates to improvements in frequency modulation systems and more particularly to means for automatically tuning a frequency discriminator for shift in carrier frequency.

In frequency modulation systems, measuring or control circuits, or any circuit by which intelligence is communicated through signal frequency change, errors will be introduced if the carrier frequency fluctuates. If frequency modulation is used in recording on a magnetic tape or wire, or on a film, disc or similar record carrier, variations in the drive speed of the record either during recording or reproduction will introduce similar errors. Assuming for example a frequency deviation of ten percent produced by modulation, a one percent speed variation of the record will result in an output error of ten percent in the communicated intelligence. From the foregoing it is clear that speed compensation is quite important in such recording and reproduction.

An important object of the invention is to provide means for maintaining a frequency discriminator tuned very close to a carrier frequency subject to fluctuation.

Another important object of the invention is the provision of an improved playback transcriber for frequency modulated wave records.

A further object is to provide means automatically compensating for record speed changes occurring either during recording or reproduction of frequency modulated carrier waves.

Figure 1:
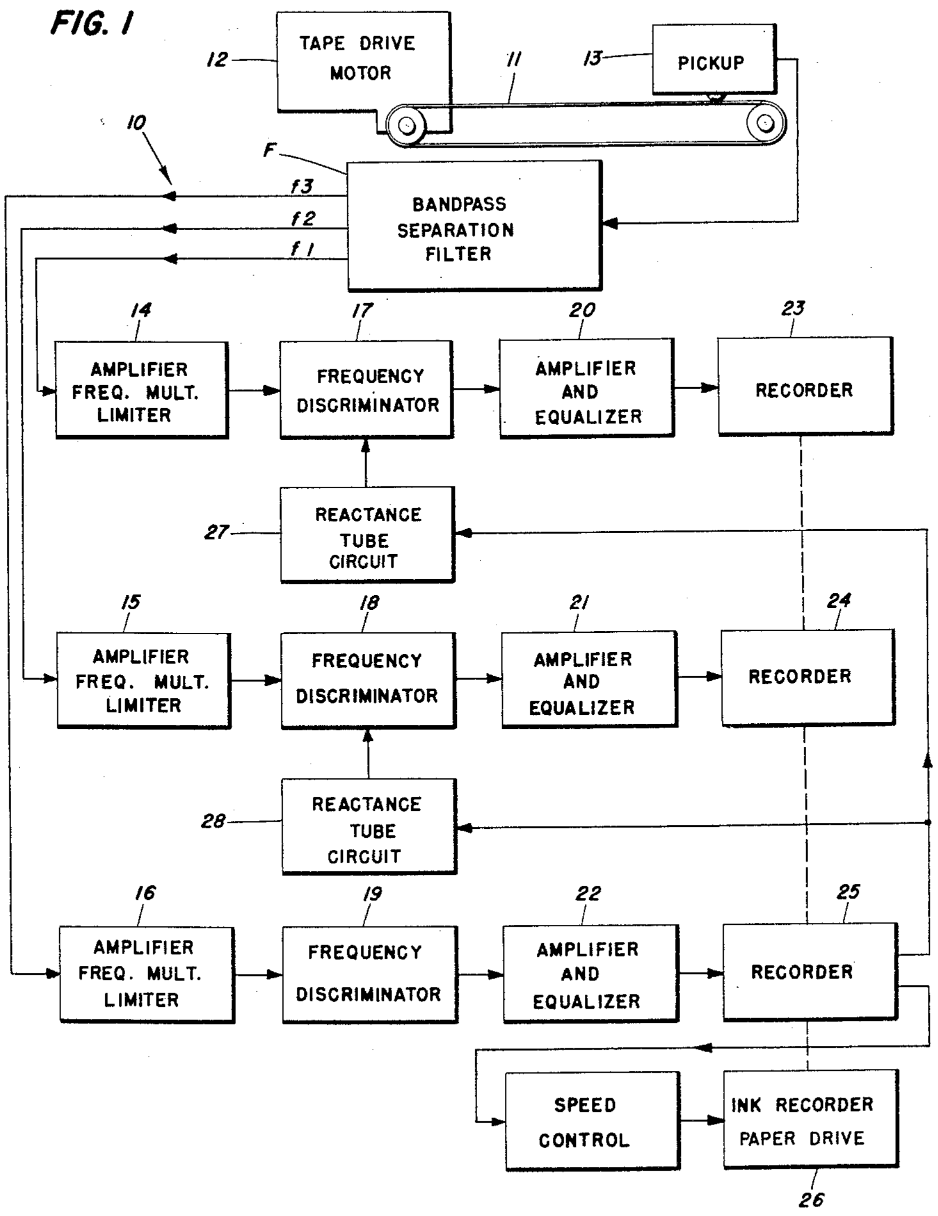
Figure 2:
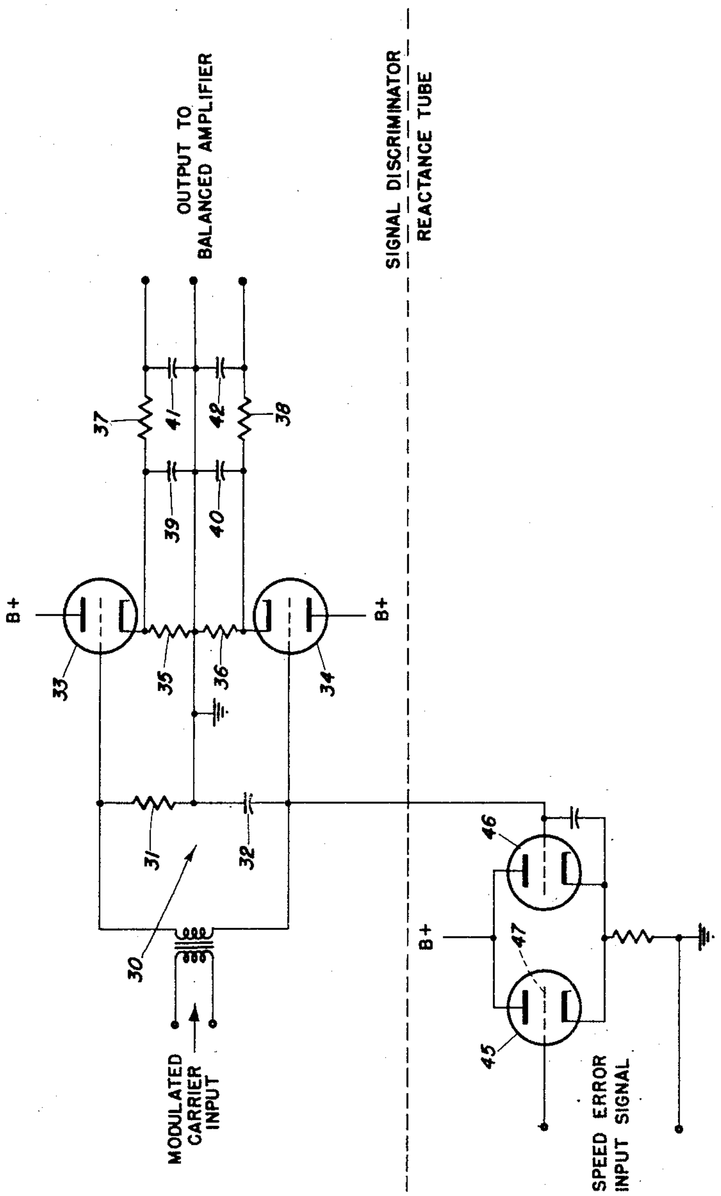

Other objects and many of the attendant advantages of this invention will be readily appreciated as the same becomes better understood by reference to the following detailed description when considered in connection with the accompanying drawings wherein:

Fig. 1 is a block diagrammatic view of a playback transcriber for a tape or wire recorder provided with record speed change compensating means; and Fig. 2 is a diagrammatic view of a frequency discriminator tuning system including a reactance tube circuit forming part of the invention.

In the drawings which for the purpose of illustration show only a preferred form of the invention and wherein similar reference characters denote corresponding parts throughout the views, the numeral 10 generally designates the improved playback transcriber incorporating means automatically compensating for record speed changes. This transcriber 10 is equipped to process two intelligence bearing fm signals and a standard or reference frequency signal. These signals are recorded on a single magnetic record channel along a wire or tape 11 driven by a motor 12 at a speed that is substantially constant in that its variation is within ±0.5 percent. The recorded signals, translated by a pickup 13 into a composite wave, are separated by a filter F into two intelligence bearing signals of frequencies $f_1$ and $f_2$ and a standard frequency signal $f_3$. Frequency multipliers 14—16 are preferably but not necessarily used to shift the carriers to a higher frequency before processing of the separate signals by frequency discriminators 17—19 and by amplifiers 20—22.

The amplified outputs of the frequency discriminators are transmitted to recorders 23—25 equipped with a speed controlled common drive 26 for the record paper.

Connected across the frequency discriminators 17, 18 that process the two intelligence bearing signals $f_1$, $f_2$ are reactance tube circuits 27, 28 each receiving an input control signal from the output circuit of the frequency discriminator 19 that processes the standard frequency signal $f_3$.

Fig. 2 diagrammatically shows a preferred form of discriminator with a reactance tube circuit connected thereacross as utilized in Fig. 1 for automatically compensating for carrier shifts in either of the two intelligence bearing signals $f_1$, $f_2$.

The frequency discriminator of Fig. 2 comprises an RC voltage divider 30, including a resistor 31 and a capacitor 32, feeding a balanced infinite impedance detector comprising vacuum tubes 33, 34 and resistors 35, 36. The detector output is filtered by a network comprising resistors 37, 38 and capacitors 39—42 to remove the carrier before amplification. Inasmuch as the voltage at the grid of tube 33 is taken from resistor 31, and that at the grid of tube 34 is drawn from the capacitor 32, the relative magnitudes and phase angles of the grid voltages are a function of frequency and thus the rectified output voltage from cathode to cathode of the tubes 33, 34 is a function of frequency.

The reactance tube circuit of Fig. 2 comprises two triodes 45, 46 in a feedback amplifier. Triode 45 is a cathode follower connected across the cathode-anode circuit of triode 46. The effective cathode impedance of the follower 45 can be changed by impressing an input signal on its control grid 47. This impedance change varies the gain of the tube 46 because of the change in load impedance thereto. Thus as the grid voltage of the tube 45 is changed, the input capacity to the tube 46 is varied, and the tuning of the discriminator is correspondingly changed.

The record speed error signal applied to the grid 47 of the tube 45 is derived from the similar discriminator 19 of Fig. 1 tuned to the correct carrier signal frequency. The operation of the discriminator 19 is such that, when the carrier frequency changes, a D. C. signal, positive or negative depending on the direction of the frequency shift, appears at the output of the latter frequency discriminator 19 and is fed to the input 47 of the tube 45. Thus as the carrier frequency changes, the discriminators 17, 18 of Fig. 1 are correspondingly retuned to the new carrier frequency.

Obviously many modifications and variations of the present invention are possible in the light of the above teachings. It is therefore to be understood that within the scope of the appended claims the invention may be practiced otherwise than as specifically described.

What is claimed is:

1. In a playback transcriber for reproducing signals without errors caused by fluctuations of the carrier frequency and by variation of the drive speed of a record and for deriving a reference frequency signal and an intelligence bearing frequency modulated signal from a driven record, said reference signal being of a frequency varying with the record speed; a frequency discriminator tuned to the carrier frequency of said intelligence bearing signal, a reactance tube circuit connected to said frequency discriminator so that changes in reactance of said tube circuit vary the frequency response of said frequency discriminator, a separate uncontrolled discriminator responsive to shifting of said reference frequency signal producing a control voltage proportional to any change in carrier frequency and of a magnitude and polarity depending on the amount and direction of the shifting of said reference frequency signal, said separate uncontrolled discriminator being connected to said reactance tube circuit, said control voltage being applied to said reactance tube circuit so that the reactance of the reactance tube circuit varies in response to the variation in said control voltage which causes the tuned frequency of the frequency discriminator to change and to automatically compensate for any change in the carrier frequency caused by variations in the record speed.

2. In a playback transcriber for reproducing a reference frequency signal and signals without errors caused by fluctuations of a carrier frequency and by variation of the drive speed of a record and for deriving a plurality of synchronously recorded intelligence bearing frequency modulated signals from a driven record, a pickup coacting with said driven record to produce a composite wave representative of said signals, a bandpass separation filter separating said signals, said reference signal being of a frequency varying with the record speed, individual frequency discriminators tuned to the carrier frequency of one of said intelligence bearing signals respectively, reactance tube circuits connected to said frequency discriminators so that changes in reactance of said tube circuits vary the frequency response of said frequency discriminators, a separate uncontrolled discriminator responsive to shifting of said reference frequency signal producing a control voltage proportional to any change in carrier frequency and of a magnitude and polarity depending on the amount and direction of the shifting of said reference frequency signal, said separate uncontrolled discriminator being connected to each of said reactance tube circuits, said control voltage being applied to said reactance tube circuits so that the reactance of each reactance tube circuit varies in response to the variations in said control voltage which causes the tuned frequency of the frequency discriminators to change and to automatically compensate for any change in the carrier frequency caused by variations in record speed.

3. A reproducer for recorded frequency modulated signals having a fixed frequency signal recorded therewith comprising, first and second discriminators tuned respectively to the center of the frequency modulated signal and the fixed frequency signal, signal separation means connected to said discriminators for transferring the appropriate recorded signal to each respectively, a reactance tube connected to the first discriminator for controlling the tuning thereof, and means connecting the output of the second discriminator to the reactance tube to control the tuning of the first discriminator in response to frequency variations detected at the second discriminator.

4. A transcriber for separately recording each of a plurality of simultaneously recorded frequency modulated signal channels having a fixed frequency signal channel recorded therewith comprising, a plurality of discriminators, one of said discriminators being tuned to said fixed frequency signal channel, the other discriminators each being tuned to the center of one of the frequency modulated signal channels respectively, signal separation means connected to said discriminators for transferring the appropriate recorded signal channel to each respectively, a plurality of reactance tube circuits each connected to one of the frequency modulated channel discriminators for controlling the tuning thereof, a plurality of recorders each connected to the output of one of said discriminators, a common drive means for all of said recorders, a speed control means for said common drive means having an input connected to the fixed frequency discriminator recorder for controlling the drive speed in response to frequency variations there detected, and means connecting the output of said last-named recorder to each of said reactance tube circuits to control the tuning of their respective discriminators in response to frequency variations detected at said fixed frequency discriminator.

References Cited in the file of this patent

UNITED STATES PATENTS

| | | |
|---|---|---|
| 1,794,932 | Usselman | Mar. 3, 1931 |
| 2,170,202 | Kupfmuller | Aug. 22, 1939 |
| 2,334,510 | Roberts | Nov. 16, 1943 |
| 2,412,039 | Fyler | Dec. 3, 1946 |
| 2,668,283 | Mullin | Feb. 2, 1954 |
| 2,685,079 | Hoeppner | July 27, 1954 |
| 2,714,202 | Downing | July 26, 1955 |